US008522983B2

(12) United States Patent
Davis

(10) Patent No.: US 8,522,983 B2
(45) Date of Patent: Sep. 3, 2013

(54) DISC FOR DISC SCREEN

(75) Inventor: Robert M. Davis, National City, CA (US)

(73) Assignee: CP Manufacturing, Inc., San Diego, CA (US)

( * ) Notice: Subject to any disclaimer, the term of this patent is extended or adjusted under 35 U.S.C. 154(b) by 313 days.

(21) Appl. No.: 12/944,214

(22) Filed: Nov. 11, 2010

(65) Prior Publication Data

US 2011/0049022 A1 Mar. 3, 2011

Related U.S. Application Data

(63) Continuation-in-part of application No. 11/305,653, filed on Dec. 18, 2005, now abandoned.

(51) Int. Cl.
*B07B 13/00* (2006.01)
*B07B 13/04* (2006.01)
*B07B 13/14* (2006.01)
*F16D 1/08* (2006.01)
*F16D 1/00* (2006.01)
*B60B 27/00* (2006.01)

(52) U.S. Cl.
USPC ........... 209/672; 209/667; 209/271; 209/261; 403/344; 403/1; 403/DIG. 7

(58) Field of Classification Search
USPC ................. 210/486; 209/667–672, 271, 261; 403/344, DIG. 7, 1; 29/428
See application file for complete search history.

(56) References Cited

U.S. PATENT DOCUMENTS

| 1,201,863 | A | | 10/1916 | Orey |
| 2,311,982 | A | | 2/1943 | Goodrich |
| 3,590,993 | A | | 7/1971 | Baker |
| 3,775,821 | A | | 12/1973 | Somerville |
| 4,538,734 | A | * | 9/1985 | Gill ............................ 209/668 |
| 4,795,036 | A | | 1/1989 | Williams |
| 4,836,388 | A | | 6/1989 | Bialagus |
| 5,425,459 | A | | 6/1995 | Ellis et al. |
| 5,586,832 | A | | 12/1996 | Zylka |
| 5,590,792 | A | | 1/1997 | Kobayashi |

(Continued)

FOREIGN PATENT DOCUMENTS

WO WO2012/064462 5/2012

OTHER PUBLICATIONS

PCT/US2011/056446, Korean Intellectual Property Office, International Search Report, May 30, 2012.

(Continued)

*Primary Examiner* — Nam Nguyen
*Assistant Examiner* — Madeline Gonzalez
(74) *Attorney, Agent, or Firm* — Thibault Patent Group

(57) ABSTRACT

A disc for releasable attachment to a shaft of a disc screen apparatus includes a hub having a bore and a single split defining a pair of opposing ends. The hub also has at least one flexible portion intermediate the opposing ends that permits the opposing ends of the hub to be separated a predetermined distance sufficient to allow the shaft of the disc screen apparatus to pass between the opposing ends into the bore. The hub has plurality of outer impacting portions configured for engaging materials to be classified and propelling the materials in a conveying direction when the hub is rotated. A mechanism is provided to secure the hub to the shaft so that the shaft extends through the bore.

6 Claims, 7 Drawing Sheets

(56) References Cited

U.S. PATENT DOCUMENTS

| | | |
|---|---|---|
| 5,740,922 A | 4/1998 | Williams |
| 5,799,801 A | 9/1998 | Clark et al. |
| 5,857,800 A * | 1/1999 | Nell .......................... 403/344 |
| 6,056,332 A | 5/2000 | Foster |
| 6,076,684 A | 6/2000 | Bellegraaf |
| 6,241,100 B1 | 6/2001 | Tanner et al. |
| 6,318,560 B2 * | 11/2001 | Davis .......................... 209/672 |
| 6,349,614 B1 | 2/2002 | Matsuo |
| 6,935,806 B2 | 8/2005 | Nell |
| 7,578,396 B1 | 8/2009 | Garzon |
| 2007/0138068 A1 | 6/2007 | Davis |

OTHER PUBLICATIONS

PCT/US2011/056446, Korean Intellectual Property Office, Written Opinion, May 30, 2012.

Notification, International Search Report and Written Opinion dated May 30, 2012 for PCT/US2011/56446.

* cited by examiner

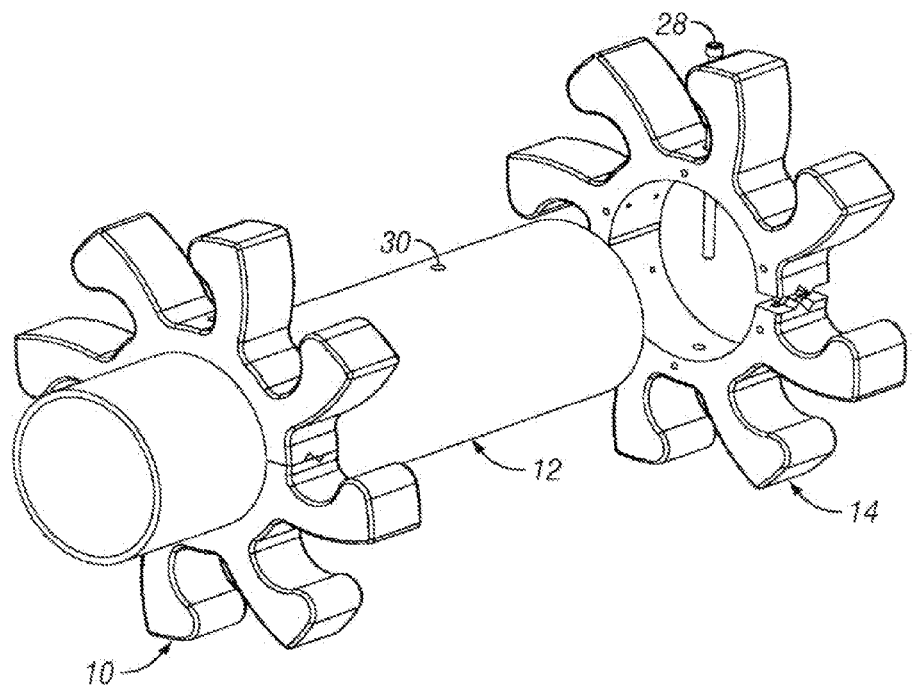
FIG. 1
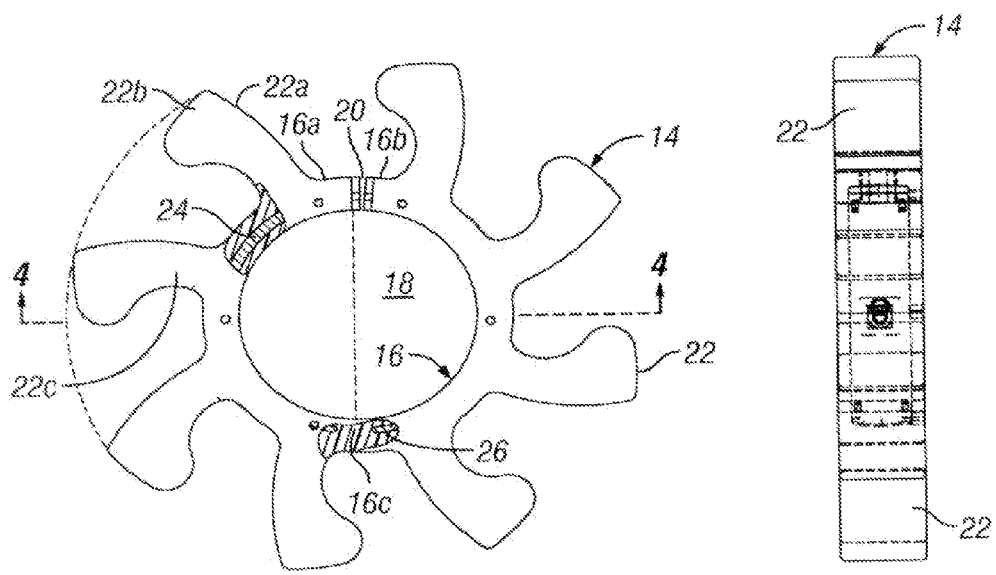
FIG. 2
FIG. 3

US 8,522,983 B2

DISC FOR DISC SCREEN

RELATED APPLICATION

The present application is a Continuation-In-Part of co-pending U.S. patent application Ser. No. 11/305,653, filed Dec. 18, 2005, the contents of which are incorporated herein by reference in their entirety.

BACKGROUND

1. Field of the Invention

The present invention relates generally to machines used to separate particulate materials or mixed recyclable materials into difference fractions, and more particularly, to a disc construction for a disc screen that allows its discs to be more easily removed and replaced.

2. Related Art

Disc screens have long been used to separate particulate materials such as wood chips into difference fractions, according to size. More recently disc screens have been used to separate or classify mixed recyclable materials into respective streams of similar materials such as broken glass, containers, mixed paper and newspaper.

A disc screen typically includes a frame in which a plurality of rotatable shafts are mounted in parallel relationship. A plurality of discs are mounted on each shaft and a chain drive rotates the shafts in the same direction. The discs on one shaft interleave with the discs on each adjacent shaft to form screen openings between the peripheral edges of the discs. The size of the openings determines the dimension (and thus the type) of material that will fall through the screen. Rotation of the discs, which have an irregular outer contour, agitates the mixed recyclable materials to enhance classification. The rotating discs also propel the larger articles which are too big to fall between the discs across the screen. The general flow direction extends from an input area where the stream of material pours onto the disc screen to an output where the larger articles pour off of the disc screen. The smaller articles fall between the discs onto another disc screen or a conveyor, or into a collection bin.

The discs of a disc screen normally have a central opening or bore that allows them to be slid over the end of a shaft which may have a round or square cross-section. See for example U.S. Pat. No. 4,836,388 of Bielagus granted Jun. 6, 1989. Over time, the discs wear out and must be replaced. It is not practical to re-surface or repair damaged or worn discs without removing them from the shafts of the disc screen. However, it is tedious to dismount the ends of the shafts of a disc screen from their respective bearings so that the old discs can be removed and replaced by sliding the discs off the ends of the shafts. Moreover, if only singe disc is worn out or broken, it is usually necessary to remove several discs before the damaged or broken disc can be slid off the shaft. In order to alleviate these problems, a split disc was developed by CP Manufacturing, Inc. of National City, Calif. See U.S. Pat. No. 6,318,560 of Robert M. Davis granted Nov. 20, 2001. The split disc is comprised of two identical halves which are assembled around a shaft and tightly held together by a pair of bolt assemblies which clamp the disc to the shaft. Each disc half is made of an outer rubber portion which is stiffened with a rigid internal metal frame embedded inside the rubber portion. While the aforementioned patented two-piece disc construction has been commercially successful, it would be desirable to provide a disc construction that is even more convenient to remove and install.

SUMMARY

Embodiments described herein provide new discs for disc screens.

In one embodiment, a disc for releasable attachment to a shaft of a disc screen apparatus includes a hub having a bore and a split defining a pair of opposing ends. The hub has plurality of outer impacting portions configured for engaging materials to be classified and propelling the materials in a conveying direction when the hub is rotated. A mechanism is provided to secure the hub to the shaft so that the shaft extends through the bore. The hub is configured to flex or pivot open to move the opposing ends apart by a sufficient distance to allow the hub to be placed transversely over a shaft or removed transversely from the shaft. This allows the disc to be easily removed as needed for repair or replacement, without having to slide the disc axially onto or off the end of the shaft or secure two separate disc halves around the shaft, as was necessary in prior arrangements. The hub may be generally ring-shaped or of other peripheral shapes in alternative embodiments.

The disc in one embodiment is of elastomeric material and a flexible, generally C-shaped strap is embedded in the elastomeric material of the hub with opposite ends adjacent the respective opposing ends of the hub. A portion of the hub which is diametrically opposite the split flexes to allow the opposite ends at the split to be spread apart, acting as a living hinge. The strap also flexes into a more open condition as the ends of the split hub are spread apart. In one embodiment, the opposing ends of the hub and embedded strap are secured together by a releasable fastener extending transversely across the slit from one end of the hub to the other. The hub may have one or more locating posts or pins which project inwardly into the central opening in the ring shaped hub when the hub is closed around a shaft. The pins or posts may be mounted on the inner surfaces of the strap and project through the hub into the bore. The pins are configured to engage in one or more corresponding holes in the shaft so that the disc rotates with the shaft when in use. Where the disc is designed to engage over a non-circular shaft and has a through bore of matching non-circular shape, the locating pin or pins are eliminated.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is an exploded perspective view of a shaft of a disc screen with a pair of hinged discs according to a first embodiment, one being mounted on the shaft and another one in position for mounting;

FIG. 2 is a side elevation view, with portions broken away, of one of the hinged discs of FIG. 1;

FIG. 3 is an end elevation view of the hinged disc of FIG. 2 taken from the left side of FIG. 2 and illustrating details of embedded structures in phantom lines;

DETAILED DESCRIPTION

Figure 4:
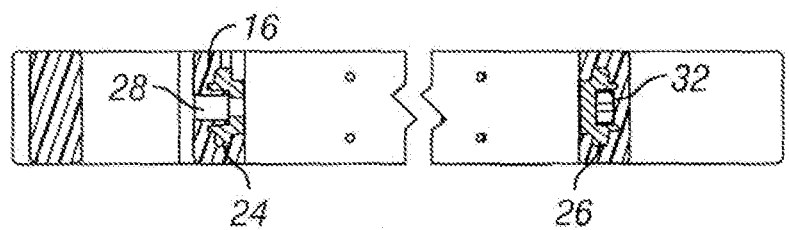
FIG. 4 is a cross-sectional view of the hinged disc of FIG. 2 taken along line 4-4 of FIG. 2.

Certain embodiments as disclosed herein provide for a disc for a disc screen which has a hub with a through bore or opening for engaging over a shaft of a disc screen apparatus, the hub having a split defining opposing ends of the shaft which can be urged apart to produce a gap which can be engaged transversely over the shaft or removed transversely from the shaft for repair or replacement purposes. Portions of the flexible hub opposite the slit are adapted to flex and act as a living hinge to allow opposite ends of the hub at the slit to be urged apart.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Referring to FIG. 1, a first hinged disc 10 according to a first embodiment is mounted on a hollow round shaft 12 and a second identical hinged disc 14 is in position for mounting on the shaft 12. Only a portion of the shaft 12 is illustrated in FIG. 1. The shaft would typically be long enough to support a dozen or more discs in spaced apart fashion. The ends of the shaft 12 are supported by bearing assemblies (not illustrated) of a disc screen (not illustrated) such as those disclosed in U.S. Pat. No. 6,250,478 of Robert M. Davis granted Jun. 26, 2001 and U.S. Pat. No. 6,648,145 of Robert M. Davis et al. granted Nov. 18, 2003, and co-pending U.S. patent application Ser. No. 10/044,222 of Robert M. Davis filed Nov. 21, 2005, the entire disclosures of which are incorporated herein by reference.

Referring to FIG. 2, each hinged disc, such as the hinged disc 14, is specially configured for use in classifying mixed recyclable materials. The hinged disc 4 includes a hub 16 formed of an elastomeric material, i.e. a rubber-like synthetic polymer such as silicone rubber or polyurethane having a bore 18 and a split 20 defining a pair of opposing ends 16a and 16b. The hub is generally ring-shaped in the illustrated embodiment but may be of other shapes in alternative embodiments. Hub 16 also has a hinge segment 16c intermediate the opposing ends 16a and 16b that permits them to be manually separated a sufficient to distance to allow the shaft 12 to pass between the opposing ends 16a and 16b into the bore 18. A plurality of outer impacting elements 22 in the form of radially extending arms are supported on the hub 16 and are configured for engaging materials to be classified (not illustrated) and propelling the materials in a conveying direction when the hub is rotated. The hinged disc 14 is designed to be rotated clock-wise in FIG. 2 for propelling materials to the right. The impacting elements 22 are also made of elastomeric material and are integrally formed with the hub 16.

Figure 5:
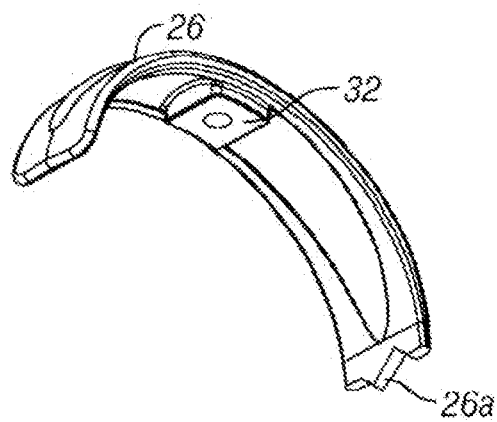
FIG. 5 is a perspective view of one of the metal inserts of the hinged disc of FIG. 2.

The hub segment 16c has sufficient flexibility to allow the opposing ends 16a and 16b to be manually separated for mounting the hinged disc 14 on the shaft 12. A pair of identical rigid inserts 24 and 26 are embedded in the hub 16 on opposite sides of the hinge segment 16c. The inserts 24 and 26 are preferably made of metal, such as cast aluminum. The lightweight metal inserts 24 and 26 provide additional strength and rigidity to accommodate means for securing the hub 16 to the shaft 12 so that the shaft 12 extends through the bore 18. The opposing ends 16a and 16b of the hub 16 and the inserts 24 and 26 have complementary mating shapes to aid in aligning these opposing ends when the hub 16 is secured to the shaft 12. More particularly, the mating shapes have a saw-tooth configuration such as 26a as best seen in FIG. 5.

In the form illustrated, the means for securing the hub 16 to the shaft 12 comprises a fastener in the form of a stainless steel bolt 28 (FIG. 1) that extends through the hub 16, through a hole in the shaft such as 30. One insert, such as the insert 26 (FIG. 5) has a stainless steel nut 32 seated in a rectangular aperture. The bolt 28 extends through the rectangular aperture in the other insert 24, and through the shaft 12, and its male end is screwed into the female threaded nut 32 held in the rectangular aperture in the insert 26 and embedded within the hub 16. Other forms of securing means can be utilized, such as a bolt that does not penetrate the shaft 12 but instead holds the hub 16 tightly clamped around the shaft 12. In such a case the hub 16 should be dimensioned such that the opposing ends 16a and 16b do not contact each other, leaving the split 20 open when the hub 16 engages the shaft 12. This allows the hub to be tightened against the shaft 12 by drawing the opposing ends 16a and 16b toward each other. The securing means could also take the form of ancillary collars, clamps, brackets and/or sleeves for indirectly attaching or holding the hub 16 to the shaft 12 in releasable fashion.

The impacting elements 22 (FIG. 2) are specially configured for classifying a stream of mixed recyclable materials. The leading edge 22a has a slightly curved shape. The outer end of each impacting element 22 is formed with an enlarged lobe 22b that takes longer to wear away. The spoke portion 22c of each impacting element 22 is dimensioned to allow the element 22 to flex rearwardly under load, allowing some of the leading edge 22a to contact the materials being classified.

In one embodiment, hinged disc 14 is integrally molded as one unitary piece of elastomeric material in a mold (not illustrated) after the inserts 24 and 26 of cast aluminum or the like have been positioned within the mold. The use of synthetic rubber, polyurethane or other similar durable elastomeric materials provides the impacting elements 22 with high friction impacting surfaces to maximize or increase their propelling action. The use of elastomeric material also minimizes the likelihood of breaking glass containers propelled across the disc screen.

The hinged disc 14 is easier to dismount and mount than prior split discs because it is lighter, and only requires a single bolt to be removed and replaced. Also, the repairman does not need to hold up two separate disc pieces around the shaft, and try to insert bolts at the same time. A disc screen may incorporate several hundred discs, and the savings in terms of materials (expensive stainless steel bolts) and installation time can be significant. Moreover, the lighter weight of the hinged disc 14 than conventional split disks lessens the likelihood of damaged bearings, bent shafts and broken shafts.

Figure 6:
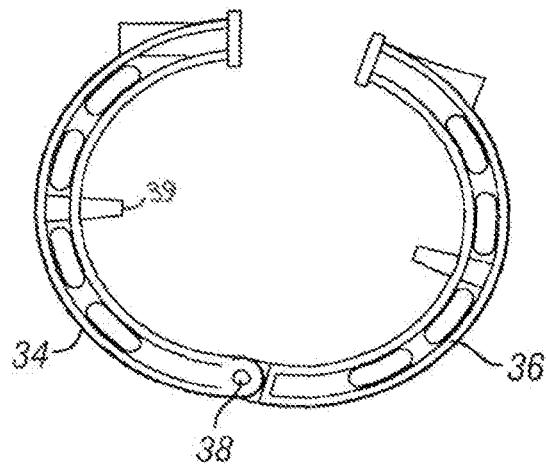
FIG. 6 is a side elevation view of an alternative, hinged metal insert for the hinged disc of FIG. 2.
Figure 7:
FIG. 7 is an end elevation view of the hinged metal insert of FIG. 6.
Figure 8:
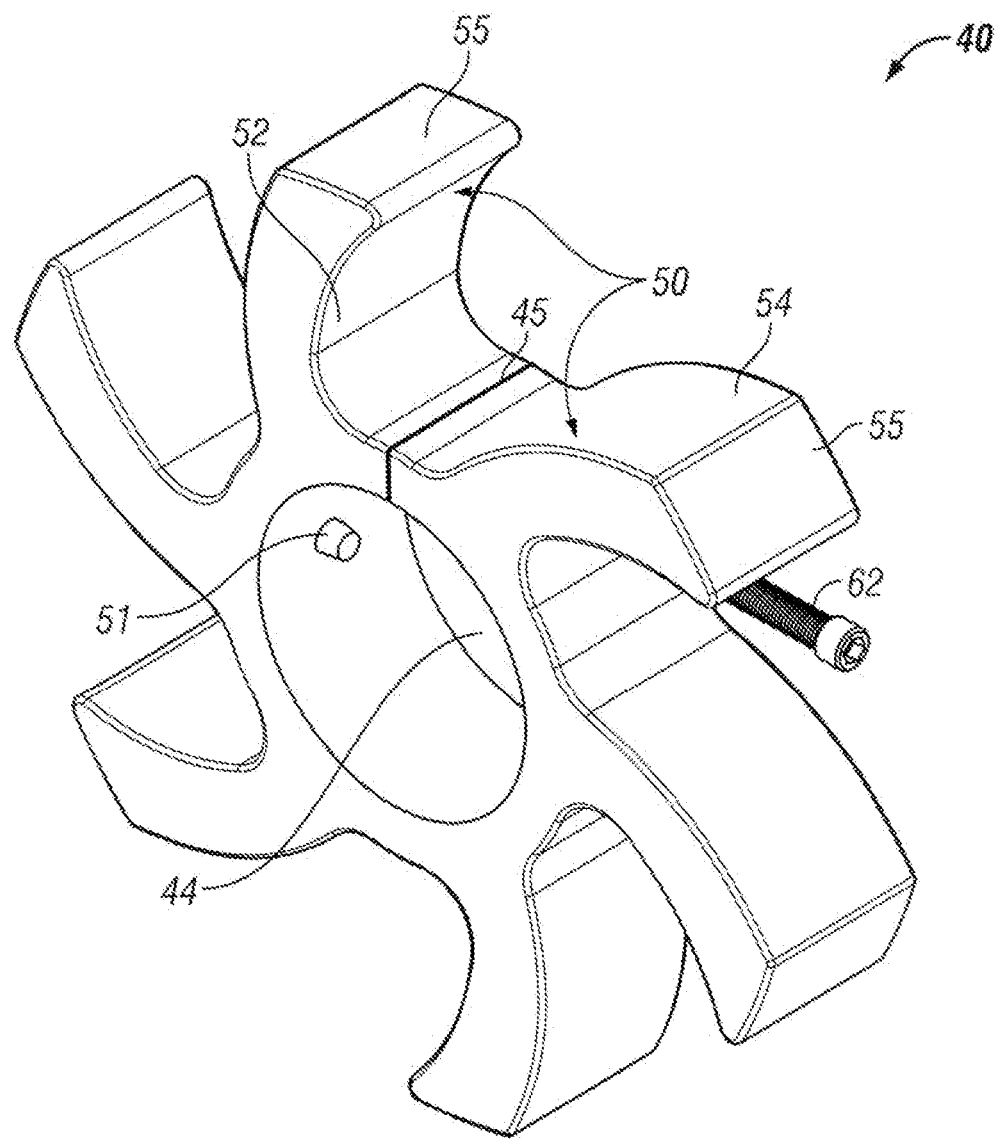
FIG. 8 is a perspective view of a second embodiment of a disc for mounting on the shaft of a disc screen in place of the hinged discs of FIG. 1.
Figure 9:
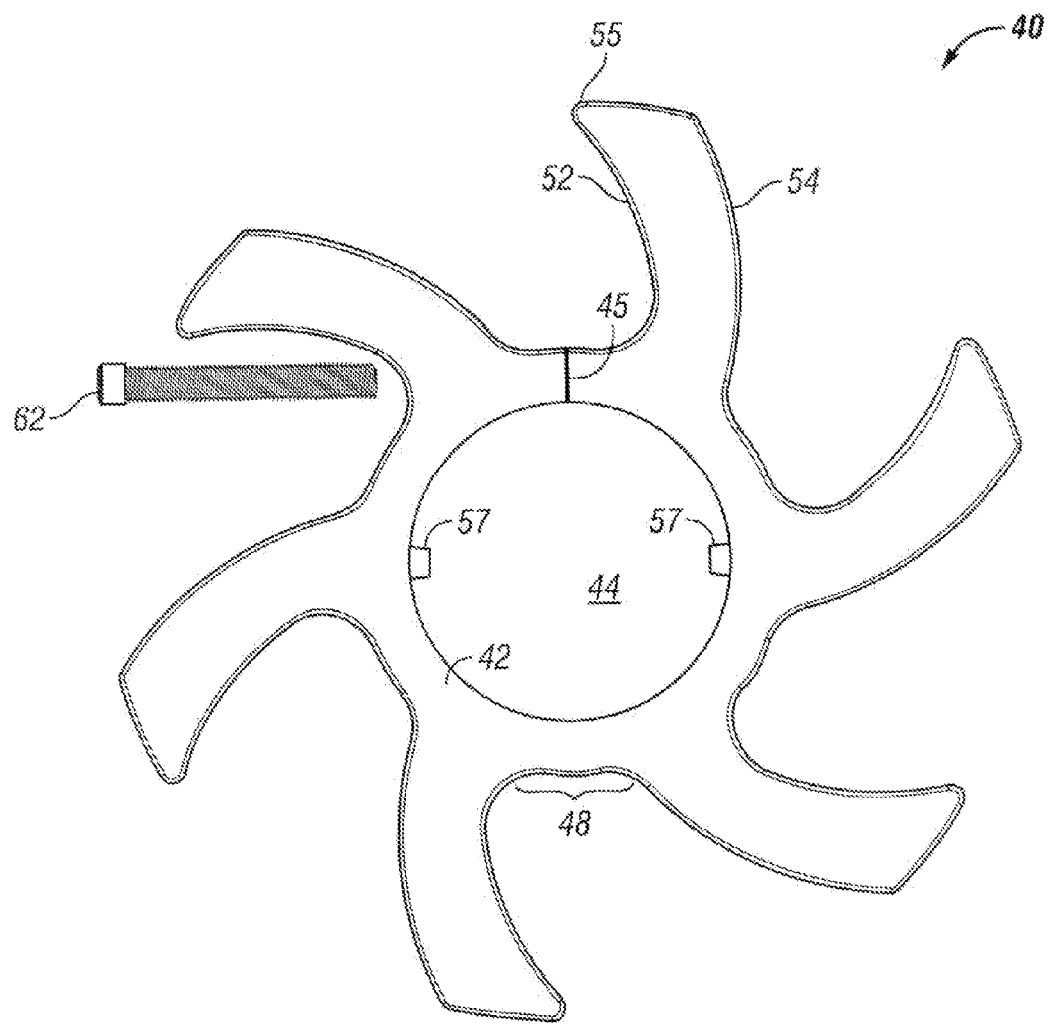
FIG. 9 is a rear elevation view of the disc of FIG. 8.

Instead of using a segment of an elastomeric hub as a living hinge to allow the ends of the hub to be spread apart so that a shaft can be inserted or removed transversely from opening 18 between the spaced ends 16a and 16b, in an alternate embodiment the hinge may comprise a mechanical hinge assembly portion of the hub. Referring to FIGS. 6 and 7 the adjacent ends of a pair of cast aluminum semi-circular inserts 34 and 36 are pivotally connected by a pin 38. These inserts are placed inside a mold and encased in suitable elastomeric material (not illustrated) and to form impacting elements (not illustrated) at the same time. Apart from having hinged inserts rather than separate inserts as in FIGS. 1 to 5, the disc may be of the same structure and external configuration as in FIGS. 1 to 5 in this embodiment. As illustrated in FIG. 6, the inserts 34 and 36 may each have a radially inwardly directed pin or post 39 designed to engage in a corresponding opening in shaft 12, similar to opening 30. In this case, the opposite ends of the hub are secured together around the shaft by a suitable fastener extending through the opposite ends and transversely across the slit between the two opposing ends, rather than a fastener extending through both the hub and the shaft.

FIGS. 8 to 12 illustrate a disc 40 for a disc screen apparatus according to another embodiment. The disc is similar to that of FIGS. 1 to 5 and designed for placement about a shaft 12 in a similar manner to that illustrated in FIG. 1 for the disc 14 of the first embodiment. However, disc 40 does not have cast metal inserts 24, 26 as in the first embodiment, and is secured around the shaft 12 in a different manner. Additionally, the impacting elements or impacting portions 50 are of a different shape.

Figure 10:
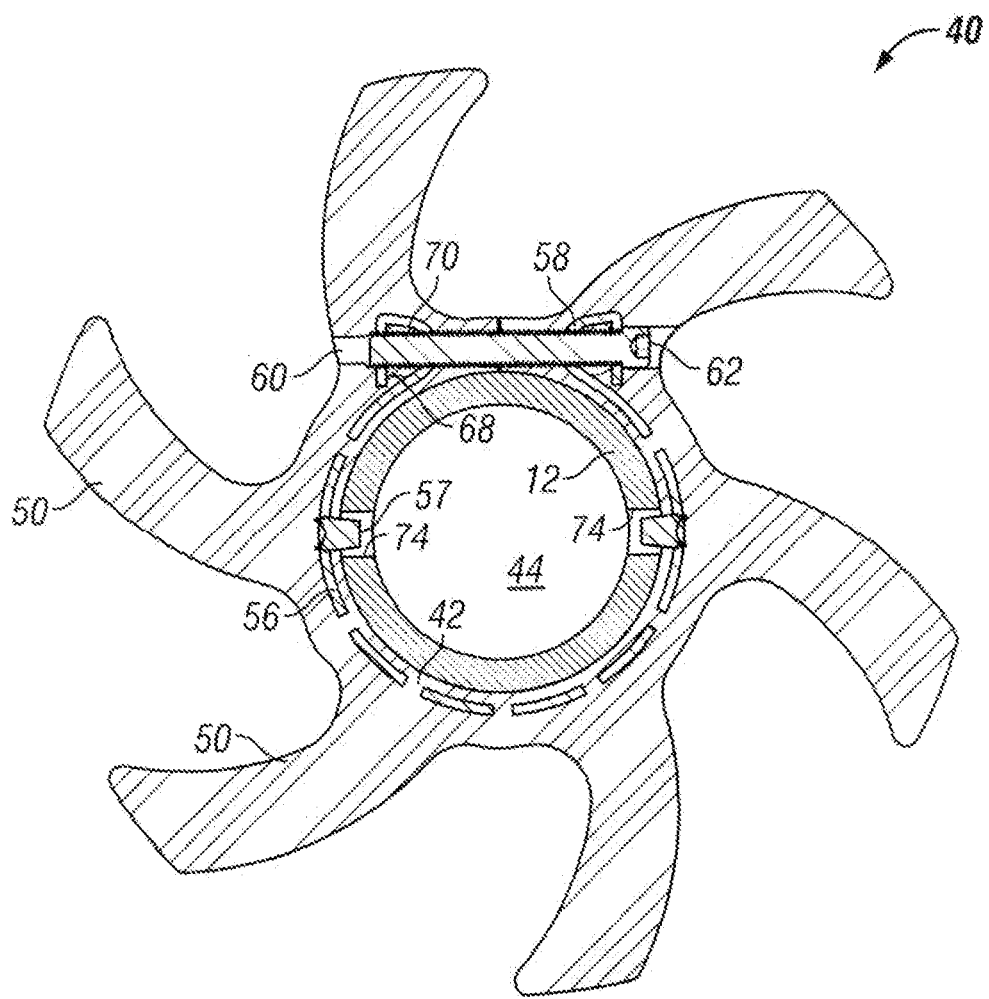
FIG. 10 is a vertical cross sectional view of the disc of FIGS. 8 and 9, illustrating the screw fastener engaging through aligned bores in the opposite ends of the disc hub to secure the disc over a shaft.
Figure 12:
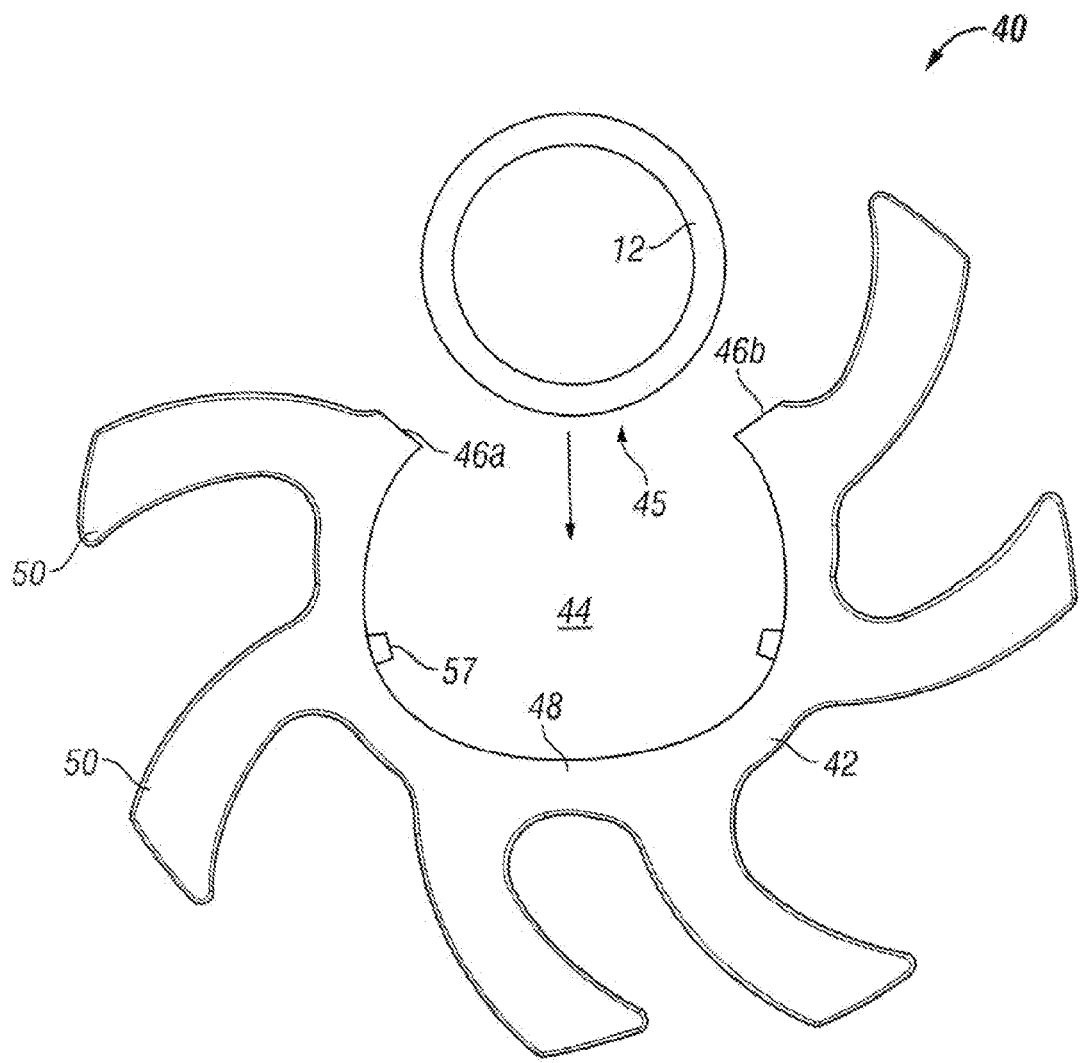
FIG. 12 is a front elevation view of the disc of FIGS. 8 to 11 with the fastener removed and the opposite ends of the split hub moved apart to allow the disc to be installed on a shaft or removed from the shaft without removing any of the other discs in a disc screen.

Disc 40 has a hub 42 with a central opening or bore 44 for engagement over shaft 12 as illustrated in FIG. 10, and a plurality of impacting elements or spokes 50 projecting outwardly from the hub which are formed integrally with the material of the hub. As in the previous embodiments, the disc is formed from an elastomeric material, which may be a rubber-like synthetic polymer such as silicone rubber, polyurethane, or the like. The disc has a single radial split 45 in its periphery forming opposing ends 46A and 46B which can be spread apart to produce a gap 45, as indicated in FIG. 12 and described in more detail below. This allows a shaft 12 to be transversely inserted into the bore 44 or removed from the bore via the space between the separated ends 46A and 46B. The disc is secured around shaft 12 by a fastener screw 62 which extends through aligned openings or bores in portions of the hub on opposite sides of split 45, as described in more detail below in connection with FIG. 10. The fastener screw is shown separate from the disc in FIGS. 8 and 9, and is engaged in the through bores to secure the hub around shaft 12 in FIG. 10.

Each impacting element 50 comprises an arm of slightly curved shape having a flat or substantially flat outer end face 55, a smooth convex leading face 54 leading up to end face 55, and a concave trailing face 52, with a rounded edge between end face 55 and trailing face 52. This is different from the shape of the impacting elements 22 of the previous embodiment which have enlarged lobes on the trailing face leading up to the outer end face. The lobes are eliminated in this embodiment.

Although the hub is generally ring-shaped in the embodiment of FIGS. 8 to 12, with a round through bore for engagement with a tubular shaft 12, and has outwardly extending impacting elements 22, it may be of other configurations in other embodiments. For example, the hub may be of alternative, non-ring shaped external configurations in alternative embodiments, and may have differently shaped impacting portions on the outer periphery of the hub. The through bore may also be of different shapes for engagement over shafts of different cross-sectional shapes, such as square.

Disc 40 of FIGS. 8 to 12 has a generally C-shaped band or strap 56 embedded in the hub. Strap 56 has opposite end portions 58 located adjacent the opposite end faces 46A and 46B at the slit, as illustrated in FIG. 10. The strap 56 is illustrated in more detail in FIG. 11, and may be of any suitable deformable material such as steel or plastic which can deform to allow the hub to be moved into the open condition of FIG. 12. In one embodiment, the strap may be of mild steel or plastic material, formed in a suitable thickness to allow the strap to deform with the hub as the ends of the hub are spread apart during installation of the disc on a shaft. In alternative embodiments, the strap may be of spring steel or the like which tends to spring back towards its original configuration after deformation. In one embodiment, disc 40 is integrally molded as one unitary piece of elastomeric material in a mold (not illustrated) after the strap 56 has been positioned within the mold via a mold pin, so that it is embedded in the elastomeric material of the hub after molding. The slit 45 may formed between the opposite end portions of strap 56 during molding, or the hub may be molded without a slit and the slit may be cut through the disc after molding is complete and the disc is removed from the mold.

Figure 11:
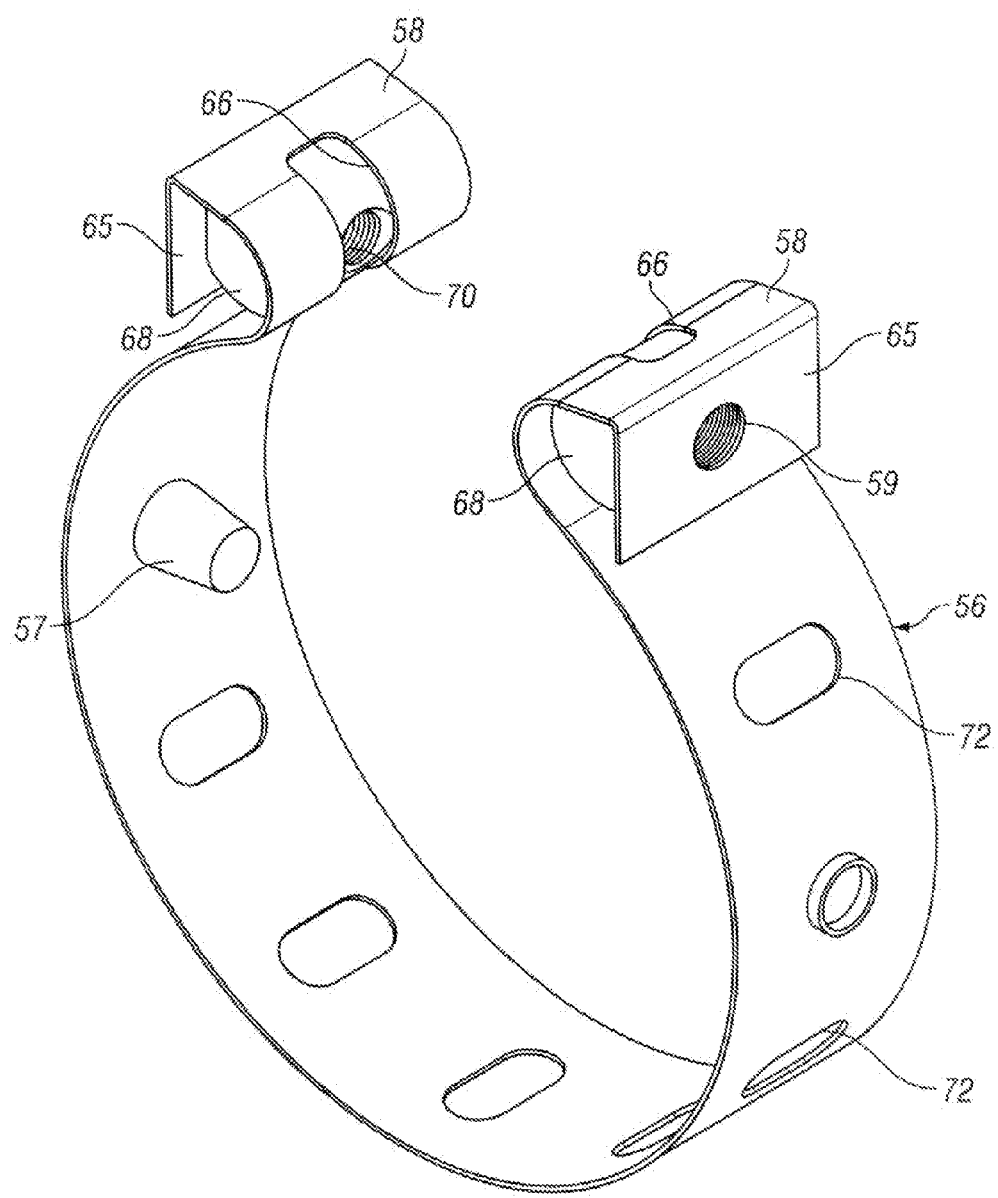
FIG. 11 is a perspective view of a strap which is embedded in the hub of the disc of FIGS. 8 to 10.

Due to the deformable material used to form strap 56, the ends of the strap can be urged apart, flexing the strap into an open condition. As best illustrated in FIG. 11, the end portions 58 of strap 56 are curved outwardly away from each other in a generally U-shape, and have down turned outer ends 65 which form parallel through bores or openings in the end portions, in which respective pins or nuts 68 are secured. Aligned openings 59 are formed in ends 65, and slots 66 extending along the outwardly bent regions of each end portion are aligned with openings 59. Transverse bores 70 are formed through the pins 68 in alignment with openings 65 and slots 66, either prior to embedding the strap in hub 42, or after the hub is formed around the strap. At least one of the pins has a threaded bore and acts as a nut configured for threaded engagement with the threaded end portion of fastener screw 62, while the bore in the other pin may be unthreaded. Band 56 also has a series of openings 72 along its length. In one embodiment, one or more locating posts or pins 57 are secured to the inner surface of strap 56 and extend inwardly into the area enclosed by the C-shaped strap. In the illustrated embodiment, diametrically opposed posts 57 are tack welded to strap 56, but only one post or pin may be provided in alternative embodiments. In other alternative embodiments, where the hub is of non-circular shape for engagement over a square shaft or other shaft of non-circular cross section, the posts 57 are not needed and are eliminated. In some embodiments, the strap may be made of spring steel so that it is biased back towards the original shape illustrated in FIG. 11 when the ends are released, but it may be made of other materials in alternative embodiments, as mentioned above, since the disc is typically installed on a shaft only once and is only removed if it needs to be replaced. Thus, a mild steel or plastic strap is sufficient to allow for the initial installation while the fastener screw extending through the ends of the strap serves to hold the disc around the shaft.

When the strap is embedded in the molded hub as illustrated in FIG. 10, the locating pins or posts 57 project inwardly from the hub into central opening or bore 44 in the hub. Alternatively, pins 57 may be integrally formed with the hub material. As noted above, only one pin may be provided on the hub in some embodiments, and the pins 57 are eliminated altogether in discs with through bores of non-circular shape for fitting over non-circular shafts. After molding the disc and forming slit 45, transverse through bore 60 is formed across a portion of hub 42 which includes slit 45 in alignment with the openings 59 and through bores 70 in the strap end portions 58, as best illustrated in FIG. 10.

The dimensions of the disc and strap vary dependent on the overall dimensions of the disc screen apparatus and the type of mixed recyclable materials to be separated. In one embodiment, the axial width of the hub and impacting elements was around 2.5 inches while the corresponding width of strap 56 was approximately 1.5 inches. The radius of the central opening in the hub was approximately 2.2 to 2.3 inches and the outer radius of the hub was approximately 3 inches, with the radial width of the hub between its inner and outer diameter being around 0.75 inches, and the radius of the partial circle formed by the C-shaped steel strap was around 2.5 inches.

In order to secure the finished hub around a disc screen shaft 12, the opposite ends 46A and 46B of the hub are urged apart to produce a gap 45 large enough to be engaged transversely over shaft 12, as indicated in FIG. 12, with the opposite portion 48 of the hub and the embedded strap 56 flexing in a manner similar to a living hinge in order to allow the ends 46A, 46B to be opened. The posts 57 engage diametrically opposite holes 74 in the shaft 12 in the closed position, as seen in FIG. 10, to keep the disc spinning with the shaft. Fastener screw 62 is engaged in bore 60 with the threaded shaft extending through the bore in the first pin 68 and transversely across the slit 45 into the threaded bore 70 in the other pin or nut 68, and tightened to draw the end portions 58 towards one another and close any gap between the opposite ends of the hub, securing the hub around shaft 12.

The unitary flexible disc with embedded strap as described above in connection with FIGS. 8 to 12 is simple and easy to manufacture and install. The ends of the hub and embedded strap are urged apart to engage the disc over a shaft. The disc is then firmly clamped around a shaft by holding the ends of the hub together using fastener 62 which urges the ends of the strap together when tightened. As with the first two embodiments, the disc can be easily removed and replaced when worn, without having to disassemble the shaft on which the disc is mounted from the disc screen apparatus. Instead, the fastener screw 62 is simply removed from any damaged or worn disc, the opposite ends 46A and 46B are urged apart to provide an opening, and the disc is removed transversely from the shaft via the resultant opening. The process is simply reversed to place a new disc onto the shaft. This makes removal of a worn disc and installation of a replacement disc very quick and convenient.

In each of the foregoing embodiments, the shape and the number of outer impacting elements on the disc can be varied widely to meet the needs of the materials being classified. The disc in any of the foregoing embodiments may have a star configuration with rounded or sharp tips, it may have a square configuration with rounded or otherwise shaped corners which comprise the impacting elements, or it may have an undulating outer contour or a triangular contour with curved edges joining angled apices. The bore through the disc need not be circular, but could be rectangular, triangular, oval or the like to accommodate shafts having matching outer cross-sections.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

I claim:

1. A disc for releasable attachment to the shaft of a disc screen apparatus, comprising:

a unitary hub of elastomeric material having a central bore and a single radial split through the hub defining a single pair of opposite end faces of the hub;

a deformable, C-shaped strap embedded in the hub and having opposite ends positioned adjacent the opposite end faces of the hub;

the C-shaped strap being configured flex outwardly at its opposite ends when the opposite end faces of the hub are spread apart at the radial split to allow a shaft of a disc screen apparatus to pass between the opposite end faces when the disc is installed on the shaft or removed from the shaft;

a releasable fastener configured to releasably secure the hub on the shaft;

the hub having a plurality of outer impacting portions integrally formed with the hub which are configured for engaging materials to be classified and propelling the materials in a conveying direction when the hub is rotated; and wherein the strap has at least one inwardly projecting post which projects through the hub and into the central bore, the at least one post being configured to engage one or more corresponding holes in a shaft when the disc is installed onto the shaft.

2. A disc for releasable attachment to the shaft of a disc screen apparatus, comprising:

a unitary hub of elastomeric material having a central bore and a single radial split through the hub defining a single pair of opposite end faces of the hub;

a deformable strap embedded in the hub and having opposite ends positioned adjacent the opposite end faces of the hub;

the embedded strap being configured flex outwardly at its opposite ends when the opposite end faces of the hub are spread apart at the radial split to allow a shaft of a disc screen apparatus to pass between the opposite end faces when the disc is installed on the shaft or removed from the shaft;

a releasable fastener configured to releasably secure the hub on the shaft;

the hub having a plurality of outer impacting portions integrally formed with the hub which are configured for engaging materials to be classified and propelling the materials in a conveying direction when the hub is rotated, the hub having opposite end portions extending up to the respective end faces, and the releasable fastener extends through at least part of the opposite end portions to secure the end faces in face-to-face engagement; and wherein the strap has at least one inwardly projecting post which projects through the hub and into the central bore, the at least one post being configured to engage one or more corresponding holes in a shaft when the disc is installed onto the shaft.

3. The disc of claim 2, wherein the ends of the strap are embedded in the respective end portions adjacent the end faces, a first end of the strap has an opening and the second end of the strap has a threaded nut aligned with the opening, and the releasable fastener extends through the opening in the first end of the strap and has a male threaded end configured for threaded engagement with the nut in the second end of the strap to draw the strap ends together and hold the end faces in face-to-face engagement.

4. A disc and shaft assembly for a disc screen of a recycling apparatus configured to separate mixed recyclable materials according to size, comprising:

a rigid shaft having opposite ends configured to be rotatably supported in a frame of a recycling apparatus;

a plurality of discs releasably mounted at spaced intervals along the shaft to rotate with the shaft and configured for classifying a stream of mixed recyclable materials;

each disc comprising a unitary hub of elastomeric material having a central bore and a single radial split through the hub defining a single pair of opposite end faces of the hub, and a deformable strap embedded in the hub and having opposite ends positioned adjacent the opposite end faces of the hub;

the shaft extending transversely through the central bores in the plurality of discs;

the embedded strap of each disc being configured to flex outwardly at its opposite ends when the end faces of the hub are spread apart to allow the opposite end faces of the hub at the radial split to be separated by a predetermined spacing sufficient to allow the shaft to pass transversely between the opposite end faces into the central opening;

a releasable fastener associated with each disc which secures the opposite end faces of the hub together to close the hub around the shaft;

each disc hub having a plurality of outer impacting portions integrally formed with the hub which are configured for engaging materials to be classified and propelling the materials in a conveying direction when the hub is rotated; and wherein the strap in each disc comprises at least one inwardly projecting post which projects through the hub and into the central bore, the shaft comprising holes spaced along its length, wherein the at least one post of each disc engages a respective one of the holes in the shaft.

5. A disc and shaft assembly for a disc screen of a recycling apparatus configured to separate mixed recyclable materials according to size, comprising:

a rigid shaft having opposite ends configured to be rotatably supported in a frame of a recycling apparatus;

a plurality of discs releasably mounted at spaced intervals along the shaft to rotate with the shaft and configured for classifying a stream of mixed recyclable materials;

each disc comprising a hub of elastomeric material having a central bore and a single radial split through the hub defining a single pair of opposite end faces of the hub, and a deformable strap embedded in the hub and having opposite ends positioned adjacent the opposite end faces of the hub;

the shaft extending transversely through the central bores in the plurality of discs;

the embedded strap of each disc being configured to flex outwardly at its opposite ends when the end faces of the hub are spread apart to allow the opposite end faces of the hub at the radial split to be separated by a predetermined spacing sufficient to allow the shaft to pass transversely between the opposite end faces into the central opening;

a releasable fastener associated with each disc which secures the opposite end faces of the hub together to close the hub around the shaft;

each disc hub having a plurality of outer impacting portions integrally formed with the hub which are configured for engaging materials to be classified and propelling the materials in a conveying direction when the hub is rotated, the hub of each disc having opposite end portions extending up to the respective end faces, and each releasable fastener extends through at least part of the opposite end portions of a respective disc hub to secure the end faces in face-to-face engagement; and wherein the strap has at least one inwardly projecting post which projects through the hub and into the central bore, the at least one post being configured to engage one or more corresponding holes in a shaft when the disc is installed onto the shaft.

6. The disc of claim 5, wherein the ends of the strap are embedded in the respective end portions adjacent the end faces, a first end of the strap has an opening and the second end of the strap has a threaded nut aligned with the opening, and the releasable fastener extends through the opening in the first end of the strap and has a male threaded end that is configured for threaded engagement with the nut in the second end of the strap to draw the strap ends together and hold the end faces in face-to-face engagement.

\* \* \* \* \*